(12) United States Patent
Knispel et al.

(10) Patent No.: US 7,467,652 B2
(45) Date of Patent: Dec. 23, 2008

(54) THREE-DIMENSIONAL TREAD SIPES AND MOLD BLADE FOR FORMING THREE-DIMENSIONAL TREAD SIPES

(75) Inventors: Oliver Knispel, Geinhausen-Hailer (DE); Thomas Michael Hirsch, Rheindurkheim (DE); Helmut Wolfgang Fehl, Schlüchtern (DE); Saburo Miyabe, Grossauheim (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 84 days.

(21) Appl. No.: 11/133,008

(22) Filed: May 19, 2005

(65) Prior Publication Data

US 2006/0027295 A1   Feb. 9, 2006

Related U.S. Application Data

(60) Provisional application No. 60/599,778, filed on Aug. 6, 2004.

(51) Int. Cl.
*B29C 33/42* (2006.01)
*B60C 11/12* (2006.01)

(52) U.S. Cl. ............................ 152/209.21; 152/209.23; 152/DIG. 3; 425/28.1; 425/46

(58) Field of Classification Search ............ 152/209.18, 152/209.21, 209.23, DIG. 3; 425/28.1, 35, 425/46, 47
See application file for complete search history.

(56) References Cited

U.S. PATENT DOCUMENTS

| | | | |
|---|---|---|---|
| 3,328,849 A | | 7/1967 | Kunz et zl. ..................... 18/44 |
| 3,608,602 A | * | 9/1971 | Youngblood ............... 425/28.1 |
| 5,350,001 A | * | 9/1994 | Beckmann et al. ...... 152/DIG. 3 |
| 5,783,002 A | | 7/1998 | Lagnier ................... 152/209 R |
| 6,026,875 A | | 2/2000 | Diensthuber et al. .... 152/209 R |
| 6,427,737 B1 | | 8/2002 | Katayama .............. 152/209.21 |
| 2002/0053383 A1 | | 5/2002 | Kleinhoff et al. ........ 152/209.18 |
| 2002/0139164 A1 | * | 10/2002 | Ishihara ................. 152/DIG. 3 |
| 2005/0109438 A1 | * | 5/2005 | Collette et al. ................ 425/46 |

FOREIGN PATENT DOCUMENTS

| | | | |
|---|---|---|---|
| GB | 1150295 | | 4/1969 |
| JP | 05-058118 | * | 3/1993 |
| JP | 10-080923 | * | 3/1998 |
| WO | WO 99/48707 | * | 9/1999 |

* cited by examiner

*Primary Examiner*—Steven D Maki
(74) *Attorney, Agent, or Firm*—June E. Rickey; Nancy T. Krawczyk

(57) ABSTRACT

Both a mold blade for forming sipes and the sipe so formed in a tire tread element have three-dimensional portions. In the formed sipe, the three-dimensional portion creates a constant interlocking of the opposing sipe faces. The blade and the sipe have two radially adjacent rows of projections, wherein the projections are separated by a planar section, the planar section having a defined length and width.

16 Claims, 5 Drawing Sheets

THREE-DIMENSIONAL TREAD SIPES AND MOLD BLADE FOR FORMING THREE-DIMENSIONAL TREAD SIPES

This application claims the benefit of U.S. provisional application No. 60/599,778 filed on Aug. 6, 2004.

FIELD OF THE INVENTION

The present invention is directed to a pneumatic tire. More specifically, the present invention is directed to the tread of a tire and the sipes in the tire tread.

BACKGROUND OF THE INVENTION

The tread portion of a pneumatic tire generally comprises a plurality of circumferentially and laterally extending grooves defining ground engaging rubber elements, the elements being in the form of blocks or ribs or combinations thereof. The particular size and shape of the tread elements contribute significantly to the overall performance of the tire and are for that reason designed to achieve the desired tire characteristics.

Winter type tires, as well as all-season type tires, usually have multiple sipes. A sipe is a groove having a width in the range of about 0.1% to about 1% of the tread width, i.e. the arc length of the tread surface in the axial direction. The sipe tends to close when it is located in the tire footprint at zero speed and under normal load and pressure. Sipes are typically formed by steel blades inserted into a cast or machined mold or tread ring therefor.

A sipe may extend circumferentially or laterally about the tread in a straight, curved, or zigzag manner and may be as deep as the primary tread grooves or have a depth that is greater than the groove depth. The sipes can pass through the sides of the ribs and tread blocks or be confined to the interior of the tread elements. It is also known to have sipes lying in planes which are not perpendicular to tangents to the surface of the tread at their point of intersection; the inclination of the planes defining neighboring sipes can be identical or differ step wise along the tread element length. It is further known to use sipes having a depth that varies along its length.

The presence of sipes in a tread increases the number of biting edges in the tread. The local high pressure at each biting edge improves the wiping and digging action of the tread surface, conferring to a tire excellent traction on snow and ice. Furthermore, sipes improve the flexibility of the tread elements without destroying their solidity. The easy relative longitudinal sliding between the opposed faces of the sipe weakens the resistance of the tread elements to flexing in the contact area between tread and road and therefor slows down the heat buildup of the tire; however, the sliding of the opposed faces of the sipes creates friction between the opposing sipe faces and can lead to wear of the sipes.

GB 1,150,295 discloses a tire with a rib having a plurality of sipes formed therein. The sipes have a three-dimension aspect, wherein a plurality of peaks and valleys are defined though a sipe centerline. The peaks and valleys formed are either a single point of maximum depth or a line of maximum depth. Due to the sharp lines forming the sipe configuration, while the opposing sides of the sipe interlock, there is increased abrasion at the points.

U.S. Pat. No.5,783,002 discloses a three-dimensional sipe for tire treads. The protrusions and cavities formed all have a domed configuration. The rounded opposing edges of the sipe reduces rubbing but doesn't eliminate the movement of the opposing sipe faces. EP 1073562 shows circular 3-d siping with flat spaces therebetween. The flat portions of the sipe are still subject to rubbing and wear.

SUMMARY OF THE INVENTION

The present invention is directed to a tire molded with three-dimensional sipes, and tire molding blades for forming such three-dimensional sipes. The tire has blocks and tread elements that are stiffer than conventional two-dimensional sipes and provide the tire with improved tire characteristics, such as handling and stability.

The present invention includes a tire tread, the tread having a plurality of ground engaging elastomeric elements, whereby at least one of the elements has a sipe. The sipe has a radial depth, a first sipe face, a second opposing sipe face, and a multiple dimension centerplane located equidistant from the sipe faces. In accordance with one aspect of the invention, the sipe centerplane has at least two radially adjacent rows of projections, the radially adjacent rows being separated by a planar section. The planar section has a zigzag configuration of defined length and width.

In other aspects of the invention, in the sipe centerplane, the projections in either row may having different period lengths in the depth direction of the sipe centerplane, different heights in the vertical direction, or different widths in the horizontal direction. The differences in the length, height, or width may alternate in a set pattern or may increase or decrease progressively, or in any type of ordered or random pattern.

In another aspect of the invention, either row of projections in the sipe centerplane may be a series of projections separated by a second planar section.

In another aspect of the invention, the radially outermost row of projections comprises a plurality of half cylindrical tubes, the projections being separated by planar sections.

In another aspect of the invention, the radially inner row of projections comprises projections having configurations selected from the group consisting of frustums, hemispheres, and half cylindrical tubes Also disclosed is a mold blade for mounting inside a tire mold to form a sipe in a tire tread. The blade is defined by a centerline, planar portions and at least one three-dimensional portion. The three-dimensional portion of the plane has at least two radially adjacent rows of projections, the radially adjacent rows being separated by a planar section. The separating planar section has a defined length and width.

In one aspect of the mold blade, the projections in at least one of the rows of projections have variations in the depth direction of the mold, variations in the vertical direction of the mold, or variations in the width direction of the mold.

In another aspect, the radially outermost row of projections comprises a plurality of half-cylindrical tubes, the projections being separated by planar sections.

In another aspect, the projections in at least one of the rows of projections have configurations selected from the group consisting of frustums, hemispheres, and half cylindrical tubes.

In another aspect of the invention, at least one of the rows of projections comprises projections having frustum configurations wherein the base of the frustum has at least three sides.

DEFINITIONS

The following definitions are controlling for the disclosed invention.

"Axial" and "axially" are used herein to refer to lines or directions that are parallel to the axis of rotation of a tire.

"Blade" means a protrusion in a tire curing mold that forms part of the tread design. The protrusion forms a corresponding depression in the finished tire tread.

"Radial" and "radially" are used to mean directions radially toward or away from the axis of rotation of the tire.

"Sipes" refer to small grooves molded into tread elements of a tire that subdivide the tread elements and improve traction characteristics. Sipes have a width in the range of about 0.1% to about 1% of the tread width and tend to close completely in a tire footprint. The depth of a sipe may vary around the circumference of the tread, or the depth of one sipe may be constant but vary from the depth of another sipe in the tire.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Figure 1A:
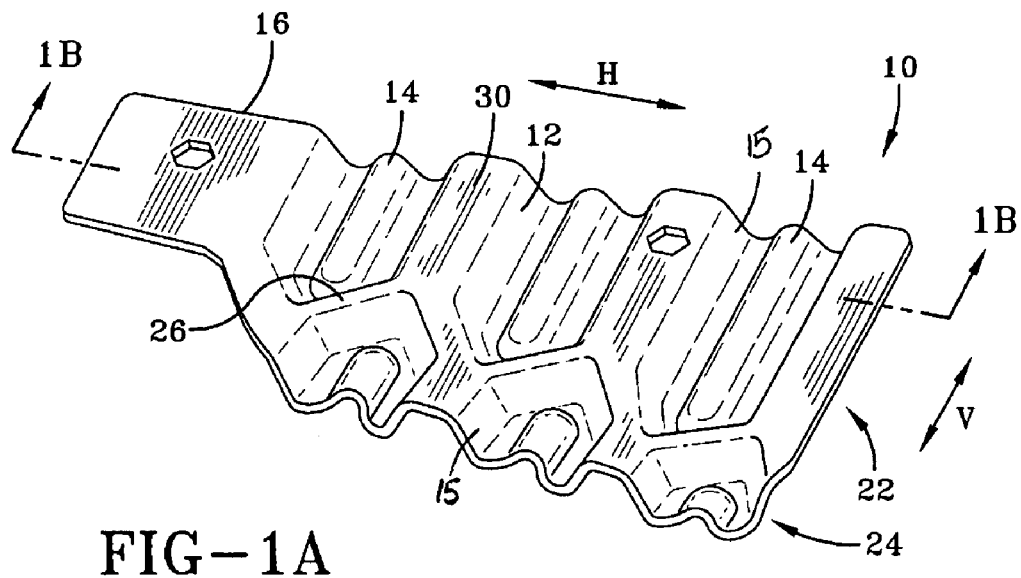
FIG. 1A illustrates a blade in accordance with the present invention.
Figure 1B:
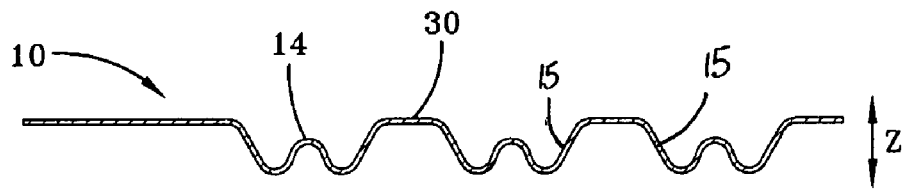
FIG. 1B is a sectional view of the blade along line 1B-1B in FIG. 1A.

FIG. 1A illustrates a blade 10 in accordance with the present invention. the blade 10 is used to form a sipe in a tire tread during molding of a tire. The blade 10 has a three-dimensional portion 12 comprising a plurality of adjacent or spaced projections 14, seen on one side of the blade as protrusions and on the other side of the blade as recesses. The blade 10 is made of metal, preferably steel, and the projecting elements 14 are made by stamping or embossing the steel sheet. Such a blade 10 is mounted into a tire mold such that the top 16 of the blade 10 is closer to the mold and the projections 14 are in the open space of the mold to form a three-dimensional sipe in a tire tread. The blade 10 has a horizontal direction H and a vertical direction V. The projections, extending from at least one side the blade, also provide the blade with a depth direction Z (see FIG. 1B). The open holes in the various blades illustrated are for mounting of the blade in the tire mold.

The blade 10, and as discussed further herein the correspondingly formed sipe 20 of the present invention, as illustrated in the embodiment of FIG. 1A, has two radially adjacent rows 22, 24 of three-dimensional projections 14. In regards to the blade 10, the radial direction is synonymous with the vertical direction V. The radially adjacent rows 22, 24 are separated by a planar section 26, the planar section 26 having a defined height in the vertical direction V and a defined length in the horizontal direction H, but which does not have any depth variation in the third direction Z. The planar section 26 can have any two dimensional configuration such as a plate, sheet, or straight line having a defined height. Preferably, the planar section 26 has a zigzag configuration having a defined height in the vertical direction V and having a defined length in the horizontal direction H, as seen in FIG. 1A. The defined height in the vertical direction V is greater than a single point, and preferably has a value equal or greater than the actual thickness of material forming the blade 10.

The radially outermost row of three-dimensional projections 14 is a series of spaced projections 14, the projections 14 being separated by a second two-dimensional planar section 30. The three-dimensional projections 14 have a half tubular or half cylindrical configuration. In addition to being separated by the planar section 30, the spaced projections 14 are set within a primary projection 15; the primary projection extends in one depth direction while the spaced projections 14 extend in the opposing depth direction. The depth of the projections 14 in the depth direction Z may be different than the full blade depth in the Z direction. The adjacent projections 14 may also have differing heights in the vertical direction. As seen in FIG. 1A, the projections increase in vertical height along the horizontal direction H of the blade 10. While not illustrated, the adjacent projections may also increase in length in the horizontal direction H of the blade 10, wherein each adjacent projection has a greater width in the horizontal length or the length varies in another manner; alternatively, the projections 14 may vary in the depth direction in any consecutive or non-consecutive manner.

The radially inner row 24 of projections 14 is a series of half tubular or half cylindrical configurations. Similar to the radially outer row 22, the tubes may have differing period lengths in the depth direction Z. Also similar to the radially outer row 22, the radially inner row projections 14 may vary in the vertical direction and/or the horizontal direction and/or the depth direction. Such variations may be dependent upon the selected configuration for the radially outer row 22.

Figure 1C:
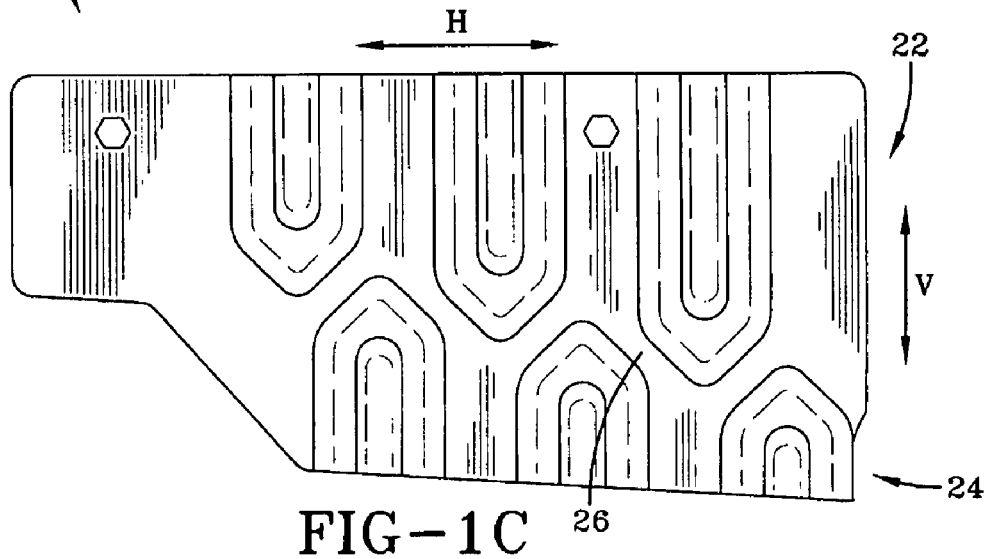
FIG. 1C is a schematic view of the blade of FIG. 1A.

Alternatively, the blade 10 may be defined as comprising an open, two layer honeycomb structure containing projections therein. Along the same plane as the two-dimensional end portions of the blade, two stacked open honeycomb layers are present along a two-dimensional plane, see the schematic representation illustrated in FIG. 1C.

When molding a tire using the blade 10, the extent of the blade 10 entering into the tread rubber, and the top 16 of the blade configuration may be varied depending on the desired tire characteristics. For a summer tire, the top 16 of the blade 10 may be formed with a two-dimensional planar section, and the blade 10 is inserted to a depth until the top planar section enters the tread rubber. For such a formed sipe, when the tread is unworn, the sipe presents itself as a straight line. Following tread wear, the sipe presentation changes. For a winter tire, the blade 10 may be inserted into the tread rubber to a depth forming an initial sipe having multiple edges at the tread surface for an unworn tire. Such multiple edges increase the number of biting edges in the tread. For the summer tire, it is desired that wear takes the summer tire to the winter tire tread depth to provide the additional biting surfaces.

Figure 2:
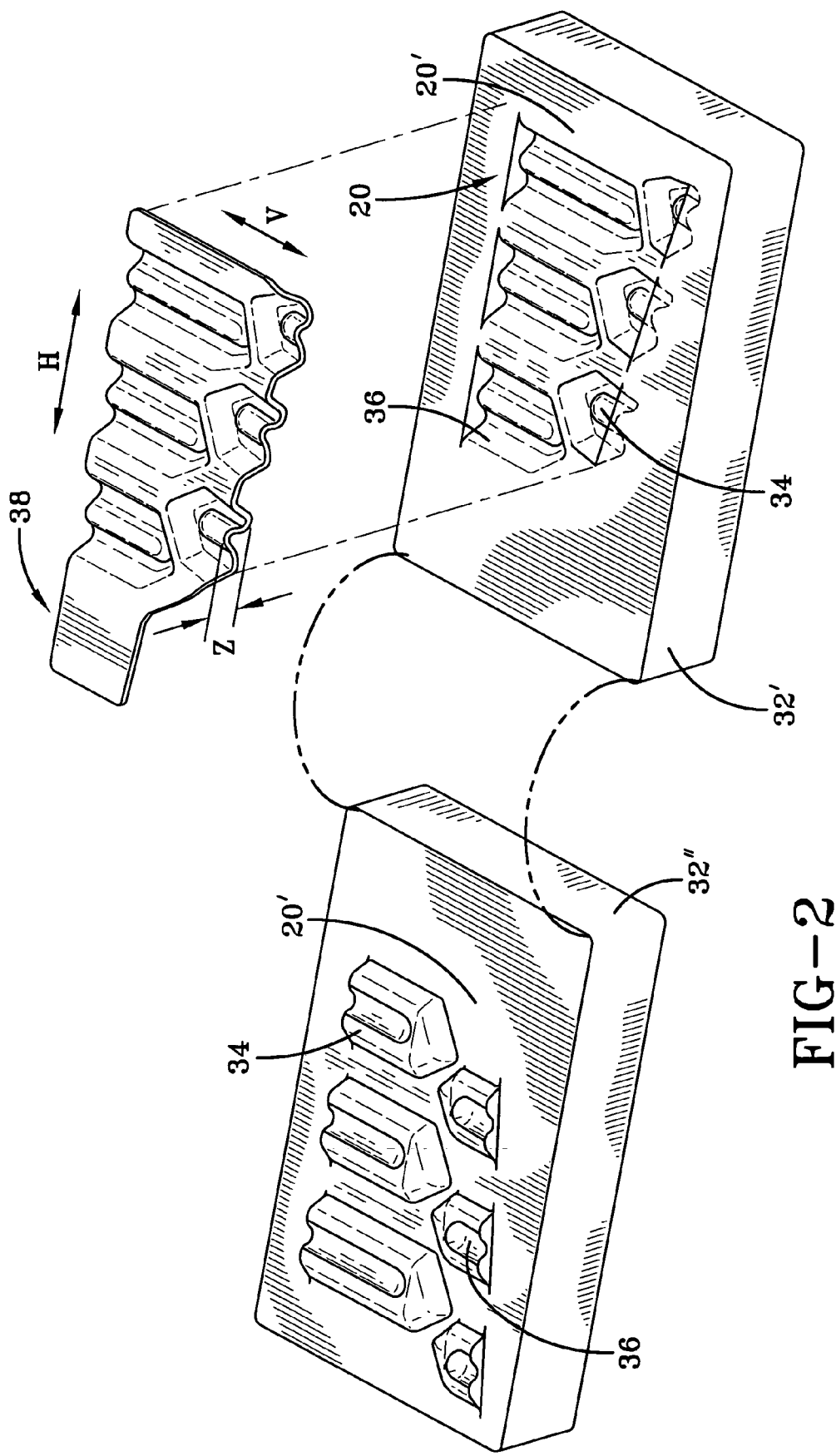
FIG. 2 is a cut view of a tread element showing the opposing sipe faces and the centerplane formed between the opposing sipe faces.

FIG. 2 shows a tread element 32 with a sipe 20 formed by the blade 10 of FIG. 1. The single elastomeric tread element 32 is a portion of a tread pattern and is shown after the tire vulcanization step wherein the sipe 20 is formed into the tread rubber. The neighboring tread elements or ribs of the tread pattern have not been represented for simplicity. Also, for simplicity, the tread element 32 is shown with only a single sipe 20; the tread element 32 may be provided with multiple sipes 20 at any inclination angle relative to adjacent grooves.

The tread element 32 is divided into two portions 32', 32" at the location of the sipe 20, showing the opposing faces 20', 20" of the sipe 20. The protrusion 34 in each sipe face 20', 20" cooperates with the recesses 36 in the opposing sipe face 20", 20'. During normal operation of the tire, when the sipe 20 enters the contact patch, the sipe 20 closes and the opposing sipe faces 20', 20" interlock, reducing slippage of the two opposing sipe faces 20', 20" A centerplane is formed equidistant from the opposing sipe faces. The centerplane is multi-dimensional and mimics the configuration of the blade 10 forming the sipe 20. The dimensions of the centerplane 38 are a) the vertical direction V, also conventionally referred to as the radial direction of the tire, having a defined height, b) the horizontal direction H, parallel to the longest plane of the centerplane regardless of orientation of the sipe in the tread element, having a defined length, and c) the depth direction Z, parallel to the short plane of the centerplane 38 regardless of orientation of the sipe 20 in the tread element 32 and corresponding to the variation in the centerplane 38 forming the recesses 36 and protrusions 34 of the spaced projections 14. As the centerplane 38 mimics the configuration of the sipe blade 10, each sipe face 20', 20" also mimics one side of the blade 10.

The sipe 20 has a defined width, preferably in the range of about 0.1% to about 1% of the tread width; the width permitting the sipe 20 to close completely when the tread element 32 enters the contact patch during tire rotation. The sipe width is preferably constant, though portions of the sipe 20 are three-dimensional and two-dimensional.

Figure 3:
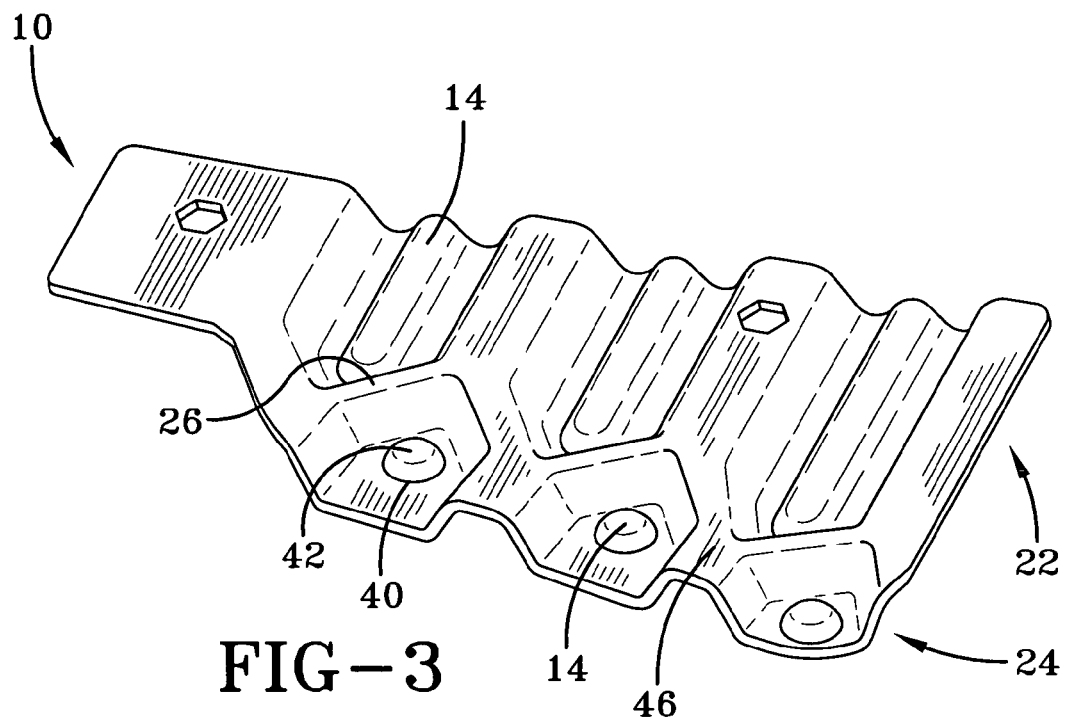
FIG. 3 is another embodiment of a blade used to make a multi-dimensional sipe.

Another embodiment of the sipe blade is shown in FIG. 3. Similar to the blade 10 of FIG. 1A, the blade 10 has two radially adjacent rows 22, 24 of three-dimensional projections 14. The radially adjacent rows 22, 24 are separated by a planar section 26; the planar section 26 having a zigzag configuration. The radially outer row 22 of projections 14 is similar to that of FIG. 1A, while the radially inner row 24 of projections 14 has a set of projections having a half-spherical or hemisphere configuration, having a circular base 40 and a domed shaped projection 42, the domed shaped projections 42 being separated by a planar section 46.

Figure 4:
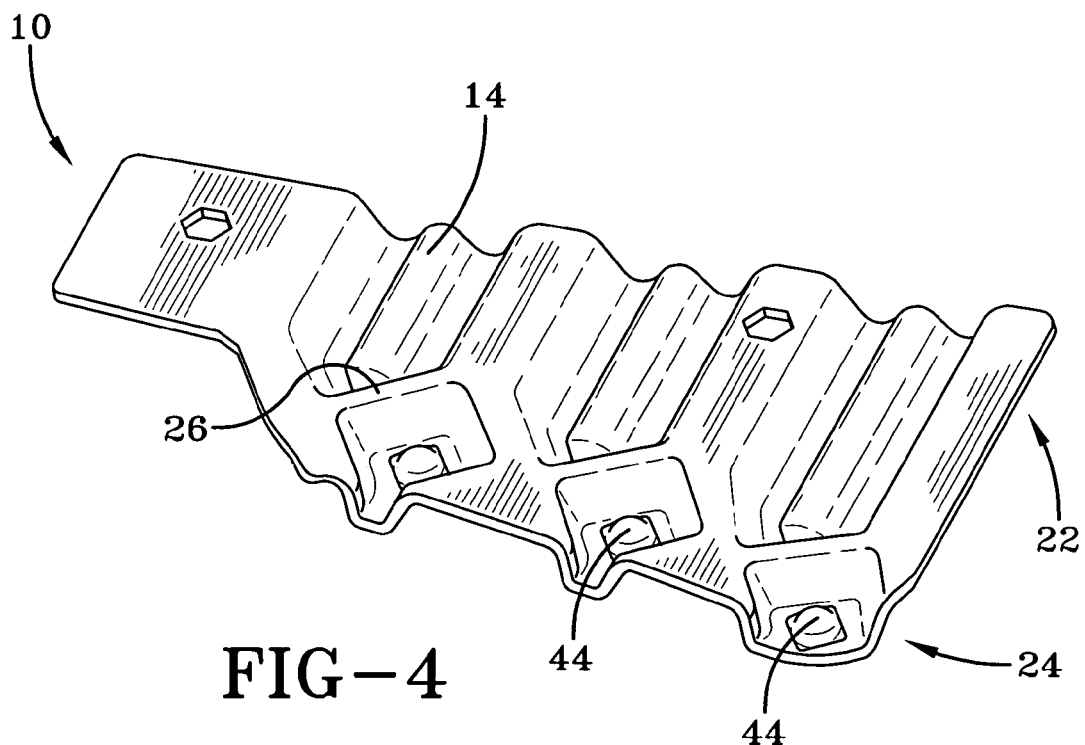
FIG. 4 is another embodiment of a blade.

Another variation of the sipe blade is illustrated in FIG. 4. The radially inner row 24 of three-dimensional projections 14 contains projections 44 having the configuration of a frustum of a four-sided element wherein the top portion is round to form a hemispherical projection. The base of the frustum, while illustrated as four-sided, may have any number of sides or have any polygonal configuration, such as triangular (see FIG. 7), pentagonal, hexagonal, heptagonal. The polygonal configuration may be a regular polygon wherein all of the sides are of equal length and all of its vertices have the same angle.

Figure 5:
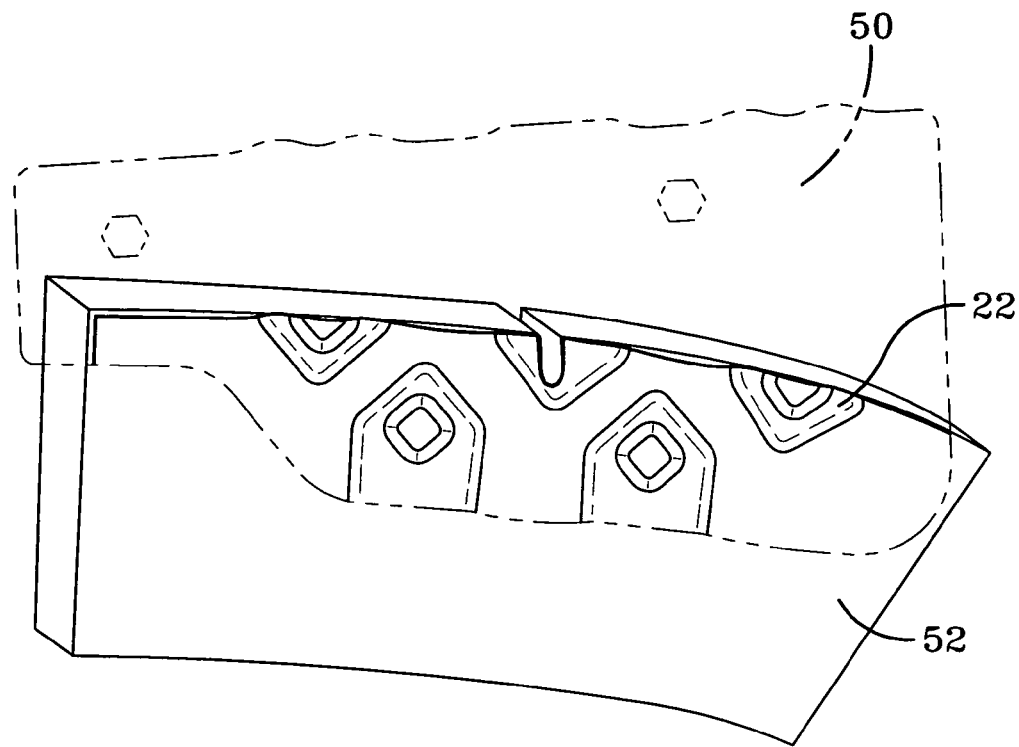
FIG. 5 illustrates a blade and tread portion during molding.

FIG. 5 illustrates another molding scenario using a blade of the present invention. The blade 50 has the same overall configuration as that illustrated in FIG. 1, wherein the depth of the blade 50 increases from one side edge to the opposing blade edge. The projection configurations of the blade 50 are similar to the blade of FIG. 6. The tread rubber 52 to be molded is not flat, but instead is defined by at least one radius of curvature. During molding of the tread rubber 52, only a portion of the blade 50 is inserted into the tread rubber 52. Because only a portion of the blade 50 is inserted into the tread rubber 52, the radially outer row of projections 22 does not need to extend to the top edge of the blade 50.

Figure 6:
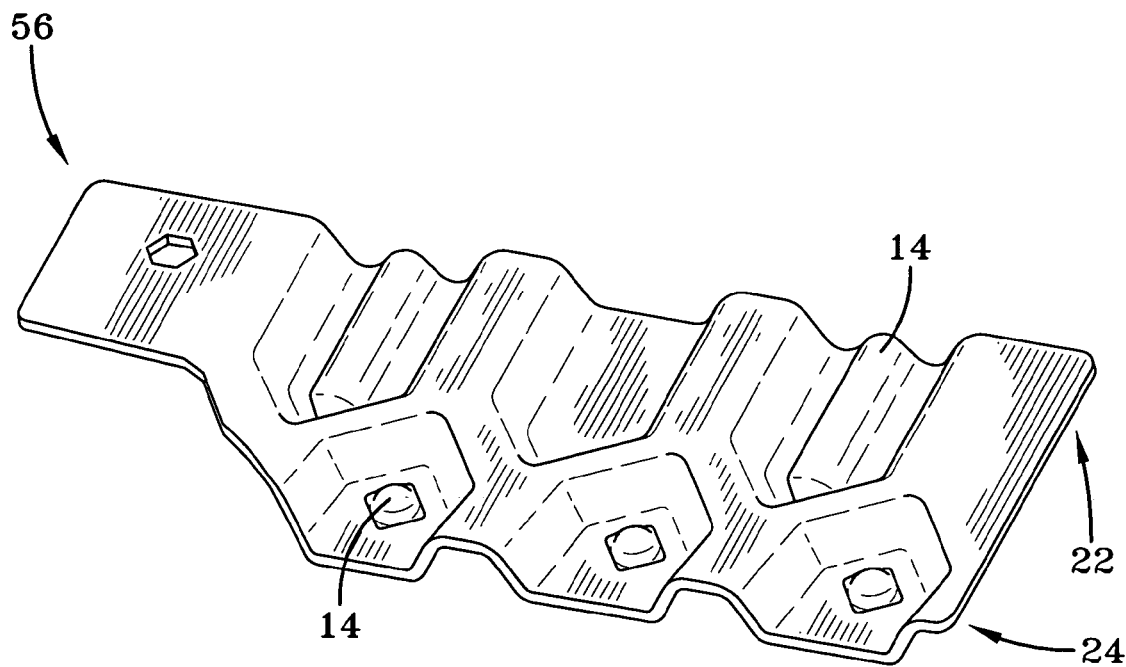
FIGS. 6 and 7 are further embodiments of blades in accordance with the present invention.

FIG. 6 illustrates another variation on the blade 56. The projections 14 in both projection rows 22,24 all have the same height in the vertical direction V. Additionally, at least one of the spaces 58 between similar projections 14 may be planar, instead of having continuously alternating projections.

Figure 7:
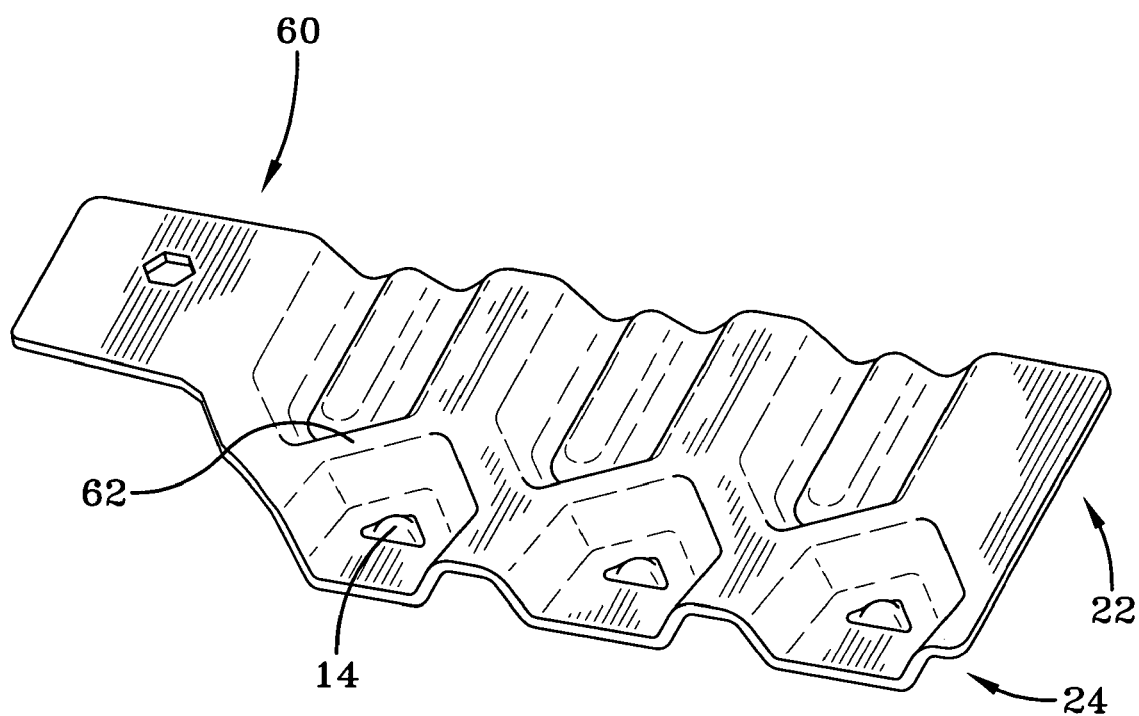

In the blade 60 of FIG. 7, the radially inner row 24 of projections 14 have configurations of a three-sided based frustum. The projection rows 22,24 are separated by a zigzag planar section 62.

Tires were molded using the blade of FIG. 1A and compared against standard two-dimensional sipes. The tires tested were all of the same construction and the tread configurations were identical so that the only difference is in the sipe configuration. The conventional tires were tested in three groups, A, B, C, as were the tires having the inventive three-dimensional sipes 1, 2, 3, with groups A and 1,B and 2, C and 3 being directly tested against each other. Test results under different operating conditions are presented below. The conventional tires are given the base rating of 100 and the three-dimensional sipe tires are judged against the conventional tires.

|  | A | 1 | B | 2 | C | 3 |
|---|---|---|---|---|---|---|
| Dry Handling |  |  |  |  |  |  |
| Straightline | 100 | 112 | — | — | 100 | 103 |
| Steering | 100 | 116 | 100 | 109 | 100 | 108 |
| Stability | 100 | 124 | 100 | 119 | 100 | 112 |
| Dry Braking | 100 | 99 | 100 | 98 | 100 | 99 |
| Wet Handling |  |  |  |  |  |  |
| Time (sec) | 99.5 | 99 | 92.7 | 93.5 | 93 | 93.6 |
| Wet Braking | 100 | 99 | 100 | 100 | 100 | 99 |
| Noise (db) |  |  |  |  |  |  |
| @ 55 km/h | 68.2 | 68.1 |  |  |  |  |
| @ 80 km/h | 72.9 | 72.6 |  |  |  |  |

The majority of the above tests results are subjective results of the drivers. The noise test results were achieved by placing microphones next to the tires at the noted speeds.

The results show that the tires with the inventive sipes have improved dry handling, especially in steering and stability area. Additionally, the wet handling times and wet braking are comparable to conventional sipes. In testing for noise, only one set of conventional tires were tested against the inventive tires; but at both 55 km/h and 80 km/h, the inventive tires tested as quieter tires.

The present invention results in a tire having improved tire characteristics, including tire blocks that have an increased stiffness provided by the interlocking aspect of the sipes.

What is claimed is:

1. A tire comprising a tread, the tread having a plurality of ground engaging elastomeric elements, wherein at least one of the elements has a sipe, the sipe has a radial depth in a vertical direction of the sipe, a first sipe face, a second opposing sipe face, and a multiple dimension centerplane located equidistant from the sipe faces, the sipe further comprising:

at least two radially adjacent rows of projections separated by a planar section, the planar section having a zigzag configuration of defined length and width, the projections of a first row of the at least two radially adjacent rows being elongated in the vertical direction of the sipe wherein each projection is located in a primary projection that extends in a direction opposite the depth direction of the projection and wherein at least three projections of the first row have different heights in the vertical direction of the sipe such that the heights of the at least three projections increases along a horizontal direction of the sipe.

2. The tire of claim 1 wherein the sipe has a constant width.

3. The tire of claim 1 wherein projections in at least one of the rows of projections have differing period lengths in the depth direction of the sipe centerplane.

4. The tire of claim 3 wherein the differing period lengths in the depth direction are alternating.

5. The tire of claim 1 wherein the projections in at least one of the rows of projections have different widths in the horizontal direction.

6. The tire of claim 1 wherein the radially outermost row of projections comprises projections having configurations selected from the group consisting of frustums, hemispheres, and half cylindrical tubes.

7. The tire of claim 1 wherein the radially inner row of projections comprises projections having configurations selected from the group consisting of frustums, hemispheres, and half cylindrical tubes.

8. The tire of claim 1 wherein at least one of the rows of projections comprises projections having frustum configurations wherein the base of the frustum has at least three sides.

9. The tire of claim 1 wherein the zigzag configuration extends from a first end of the sipe to a second end of the sipe.

10. A mold blade for mounting inside a tire mold to form a sipe in a tire tread, the blade comprising
at least two radially adjacent rows of projections separated by a planar section, the planar section having a zigzag configuration of defined length and width, the projections of a first row of the at least two radially adjacent rows being elongated in the vertical direction of the blade wherein each projection is located in a primary projection that extends in a direction opposite the depth direction of the projection and wherein at least three projections of the first row have different heights in the vertical direction of the blade such that the heights of the at least three projections increases along a horizontal direction of the blade.

11. The mold blade of claim 10 wherein the blade has a constant thickness.

12. The mold blade of claim 10 wherein projections in at least one of the rows of projections have variations in the depth direction of the mold blade, variations in the vertical direction of the mold blade, or variations in the width direction of the mold blade.

13. The mold blade of claim 10 wherein the radially outermost row of projections comprises a plurality of half cylindrical tubes, the projections being separated by planar sections.

14. The mold blade of claim 10 wherein the projections in at least one of the rows have configurations selected from the group consisting of frustums, hemispheres, and half cylindrical tubes.

15. The mold blade of claim 10 wherein at least one of the rows of projections comprises projections having frustum configurations wherein the base of the frustum has at least three sides.

16. The blade of claim 10 wherein the zigzag configuration extends from a first blade end to a second blade end.

* * * * *